US007979852B2

(12) United States Patent
Bodin et al.

(10) Patent No.: US 7,979,852 B2
(45) Date of Patent: Jul. 12, 2011

(54) SYSTEM FOR AUTOMATICALLY GENERATING OPTIMIZED CODES

(75) Inventors: François Bodin, Rennes (FR); William Jalby, Mareil sur Mauldre (FR); Xavier Le Pasteur, Bourg la Reine (FR); Christophe Lemuet, Levis-Saint-Nom (FR); Eric Courtois, Rennes (FR); Jean Papadopoulo, Antony (FR); Pierre Leca, Paris (FR)

(73) Assignees: Commissariat a l'Energie Atomique et Aux Energies Alternatives, Paris (FR); Caps Entreprise, Rennes (FR); University of Versailles Saint-Quentin-En-Yvelines, Versailles (FR)

( * ) Notice: Subject to any disclaimer, the term of this patent is extended or adjusted under 35 U.S.C. 154(b) by 1398 days.

(21) Appl. No.: 10/585,797

(22) PCT Filed: Jan. 13, 2005

(86) PCT No.: PCT/FR2005/000073
§ 371 (c)(1),
(2), (4) Date: Jul. 13, 2006

(87) PCT Pub. No.: WO2005/073851
PCT Pub. Date: Aug. 11, 2005

(65) Prior Publication Data
US 2008/0034360 A1 Feb. 7, 2008

(30) Foreign Application Priority Data
Jan. 14, 2004 (FR) ...................................... 04 00291

(51) Int. Cl.
G06F 9/45 (2006.01)

(52) U.S. Cl. .......................... 717/154; 717/150; 717/151

(58) Field of Classification Search ........................ None
See application file for complete search history.

(56) References Cited

U.S. PATENT DOCUMENTS 5,815,721 A 9/1998 Benitez
(Continued)

OTHER PUBLICATIONS

Callahan et al. "Vectorizing Compilers: A Test Suite and Results", 1988, Proceedings of the 1988 ACM/IEEE conference on Supercomputing.*

(Continued)

*Primary Examiner* — Lewis A Bullock, Jr.
*Assistant Examiner* — Jue Wang
(74) *Attorney, Agent, or Firm* — Weingarten, Schurgin, Gagnebin & Lebovici LLP (57) ABSTRACT

The inventive system for automatically generating optimizes codes (19) which are operational on a predefined hardware platform (90) comprises at least one processor which is (91) based on code sources (17) provided by users and comprises means (51, 52) for receiving symbolic code sequences or standard sequences (1) representative for the processor (91) behavior in terms of performance for a predetermined application area, means (53), for receiving static parameters (2), means (55) for receiving dynamic parameters (7), an analysing device (10) for defining optimization rules (9) on the basis of performance tests and measures determined on the basis of the standard sequences (1) and the static (2) and dynamic (7) parameters, a device (80) for optimizing and generating the code receiving the standard sequences (1) and the optimization rules (9) for examining the code sources (17) of the users, detecting optimizable loops, decomposing into cores and for assembling and injecting the codes in such a way that the optimized codes (19) are delivered and means (74) for reinjecting information which is received from the code optimizing and generating device (80) and related to the cores into the standard sequences (1).

31 Claims, 5 Drawing Sheets

U.S. PATENT DOCUMENTS

2003/0056083 A1     3/2003  Bates et al.
2003/0110481 A1*    6/2003  Wada et al. .................. 717/158
2006/0005177 A1*    1/2006  Atkin et al. .................. 717/151

OTHER PUBLICATIONS

James Stichnoth, "Generating Code for High-Level Operations through code Composition", 1997, PHD thesis CMU-CS-97-165, Carnegie Mellon University.*

McCollum et al. "A Meta-heuristic Approach to Parallel Code Generation", 2002, Proceedings of the 5th international conference on High performance computing for computational science.*

Monsifrot et al. "A machine Learning Approach to Automatic Production of Compiler Heuristics", 2002, Proceedings of the 10th International Conference on Artificial Intelligence: Methodology, Systems, and Applications.*

Stephenson et al. "Meta Optimization: Improving Compiler Heuristics with Machine Learning", 2003, Proceedings of the ACM SIGPLAN 2003 conference on Programming language design and implementation.*

Che et al. "Optimization Parameter Selection by Means of Limited Execution and Genetic Algorithms", 2003, Lecture Notes in Computer Science, vol. 2834.*

James M. Stichnoth, "Generating Code for High-Level Operations through Code Composition PHD thesis CMU-CS-97-165, 'Online" Aug. 1997 (1997-98), XP002304052 Carnegie Mellon Univ., Internet URL:http://reports-archive.adm.cs.cmu.edu/anon/1997//CMU-CS-97-165.pdf.

* cited by examiner

SYSTEM FOR AUTOMATICALLY GENERATING OPTIMIZED CODES

This application is a §371 national phase filing of PCT/FR2005/000073 filed Jan. 13, 2005, and claims priority to French application No. 04 00291 filed Jan. 14, 2004.

The present invention provides a system for automatically generating optimized code suitable for running on a predefined hardware platform comprising at least one processor, for use in a predetermined field of application and from source code submitted by users (where such users should be understood in the broad sense, including not only end users, but also applications programmers and systems programmers).

From the beginning of computing, much work has been carried out concerning compilers.

The principle of a compiler is to analyze source code written in a high level language and then generate its equivalent in binary code for the target machine. In general, this process is performed statically prior to execution. There also exist interpreters that implement dynamic compilation technologies that enable the static constraint to be lifted by making it possible to generate code at the last moment while execution is taking place.

A compiler is one element in the program preparation chain. The result of compilation can be associated with procedures that have already been compiled and generated (compiled separately or taken from libraries), and that are linked in statically on loading or dynamically on execution.

Compilers are generally organized in three stages:

1) Generating intermediate code: starting from source code, the compiler matches patterns and generates an abstract form that is independent of the source language, commonly referred to as an intermediate language. This language is independent of the target machine.

2) High level optimization: this stage combines various kinds of optimization which are generally independent of the target architecture: propagation of constants, force reduction, common expressions . . . . These optimizations correspond in general to simple metrics: reducing the number of instructions, simplifying the structure of the code.

3) Generating code and low level optimization: during this stage, all of the operations and optimizations that are specific to the target machine are performed: generating and selecting instructions, allocating registers, ordering instructions, etc.

The qualities of a compiler are associated not only with the target architecture (performance of the code that is generated) but also with the source language (difficult or easy to compile) and with its characteristics as software (robustness, richness of options, speed of execution, etc.).

Except for the special case of dynamic compilation, all three of the above stages must be performed before execution, and this must take place in reasonable time, thereby correspondingly limiting the complexity of the optimization algorithms that can be implemented in a compiler.

A large part of research on compilers was therefore initially associated with selecting and defining the high level source language.

Progress in compilers has also been associated with progress in the architecture of processors, and more precisely with performance models describing the behavior of such architectures. As in all optimization problems, a major difficulty lies in defining a cost function which is representative of execution time.

Initial instruction sets had behavior that was very simple: the execution time for a sequence of instructions could be obtained quite simply as the sum of the execution times of each of the instructions in the sequence. Consequently the process of optimization was very simple and the main optimization strategy consisted in reducing the number and the complexity of the instructions generated.

The appearance of the first complex instruction set computers (CISCs) changed circumstances a little insofar as certain very complex instructions became available. The problem of optimization then became essentially a problem of pattern matching. This category can also include vector instruction sets and vectorizers capable of recognizing loops that lend themselves directly to generating vector code. Where necessary, the source code could also be transformed to reveal vector code structures.

A discontinuity occurred in optimization strategies with the arrival of pipelines, an architectural development consisting in subdividing the processing of instructions into a plurality of operations to be performed sequentially, like an assembly line in a factory. That technique makes it possible to superpose the execution of a plurality of instructions at a given instant, thereby significantly improving the performance of systems, but it leads to significant deviations in the event of the pipeline "breaking", for example due to the presence of a branching instruction. It also puts an end to the behavior of a given code fragment being predictable. Another major discontinuity came from the use of memory hierarchies: optimization then needed to rely on fine evaluation of a very particular metric: locality (in space and in time). Nevertheless, since interaction between the processor and the memory system is simple, the optimization process should have as its main objective that of minimizing the number of misses, since each miss adds an execution time penalty. Nevertheless, it should be observed that minimizing the number of misses is difficult and can be performed essentially for simple code structures of the loop type. This difficulty in statically estimating locality properties led to the use of methods of optimization by managing profiles: the code was executed a first time to determine precisely the locality properties (to construct a profile). The profile was then used in a second pass to perform optimizations associated with making use of locality. At this level of architectural complexity, it was already very difficult to define in simple manner an effective strategy for optimization. More exactly, it was extremely difficult to know how to combine various different optimizations, even on very simple circumstances: there was no longer a mechanism suitable for modeling performance or for taking it into account in effective manner. It is in this context that iterative compilation techniques were developed, combining execution and optimization so as to generate the best code possible. More precisely, iterative compilation consists in running a loop for transforming code and then measuring its performance (statically or dynamically). Those techniques essentially consist in exploring the space of least-cost code transformations for the purpose of conserving those solutions that give the best solutions. The very high cost in computation time and in development time for such iterative methods has limited their field of application to optimizing libraries.

Reduced instruction set computer (RISC) architectures making use of sets of instructions that are simple and uniform (in contrast to CISC) became available in the middle of the 80s. The first generations of RISC processors were very limited in terms of functionality, and the quality of the code generated (in particular the ordering of instructions) then became a key factor in the performance race. In very similar manner, very long instruction word (VLIW) architectures made use of compilation techniques that were quite similar for making best use of the hardware. RISC and VLIW architectures have always had a simple performance model that is deterministic in that overall the instructions are executed in the same order as the generated program code, thereby considerably simplifying the behavior of those architectures, and thus simplifying the process of optimization. Nevertheless, those architectures very quickly generalized the use of pipelines and memory caches in order to obtain better performance (more precisely this led to an improvement of average performance to the detriment of predictability).

The appearance of superscalar architectures (capable of executing a plurality of instructions per cycle), and above all of out-of-order processing mechanisms for processing instructions have made the process of optimizing performance even more difficult. Furthermore, memory hierarchies have made rapid progress: the number of levels have increased, and above all various mechanisms have appeared that serve to manage the various caches (preloading, priority management, . . . ) in more or less explicit manner. Together these mechanisms have made the behavior of code fractions, even when very simple (a loop with access to two or three tables), extremely difficult to predict, and thus impossible to optimize on the basis of simple performance models. This situation is merely getting worse with the increasing difference between the performance of processors and that of memories.

Overall, over the last two decades, richness in terms of capabilities has increased considerably in the architecture of processors. Thus, the number of registers has increased considerably: from the eight registers that were standard on CISC architectures, RISC architectures have moved onto 32 registers, and superscalar architectures have moved onto to more than 80 registers. At first glance, it might be thought that increasing the number of registers would simplify optimization. In practice, progress in memories has made the use of registers even more crucial and on this problem of allocating registers, the cost of effective register allocation algorithms has increased considerably, since their complexity is an exponential function of the number of registers available.

In response to these recent developments, compiler technology has changed little: the number of optimizations implemented has indeed increased, but the ability to define an overall optimization strategy has not advanced, and has even decreased.

Finally, the latest trend is towards "dynamic" compilation. The principle is simple and attractive: dynamic compilation (or specialization on execution) consists in optimizing code at the last moment, i.e. on execution. A code sequence is adapted ("specialized") as a function of the input data (execution context) of a program. On execution, a mechanism "examines" the behavior of programs as a function of the frequency with which sequences of instructions are executed and decides whether or not to implement versions that are optimized for a specific execution context. This type of intrinsically dynamic mechanism is restricted to optimization techniques that are inexpensive in terms of computation time for their own implementation since they must not penalize the execution of the code they are supposed to optimize.

It should be recalled that a library is a set of procedures representing a field or a portion of such a field: the components of a library need to correspond to procedures that are standard and frequently used. The concept of a library is very old, older than the notion of compilers, and it is one of the major pillars of software engineering (reusing components). In particular, Java is an example of a language that makes very systematic use of the concept of a library.

Libraries can correspond to different levels of abstraction going from the simplest to the most complicated: BLAS 1 ("basic linear algebra subroutines level 1") is a set of very simple operations relating to vectors, but it allows a large number of conventional linear algebra algorithms to be expressed. At the other extreme, LINPACK and EISPACK are complete sets of procedures for solving linear systems and Eigen vectors and/or Eigen values respectively. A large number of libraries have been developed and are in widespread use in the following particular fields:

scientific computation: BLAS1, BLAS2, BLAS3, BLAST, SPARSE BLAS, LINPACK, LAPACK, BLACS, PVM, MPI, etc.;

signal processing: FFTPACK, VSIPI, etc.; and graphics: DirectX, OpenGL.

The fact that a certain number of libraries have been defined and identified in a given field of application is representative of the fact that the field in question can be "synthesized".

The greatest defect of libraries is nevertheless that their capability is very limited and they require manual utilization (i.e. they require an explicit call to a procedure to be inserted in the source code).

The first generations of libraries (corresponding to simple procedures of small size) were generally hand-developed in Assembler language. That has often remained the case whenever performance is a major criterion (providing, naturally, that the procedures remain of reasonable size).

However, unlike compilation which is usually an "in-line" process (compilation times must remain moderate), optimizing libraries is essentially an "off-line" process and can make use of methods that are much greedy in terms of computation time. Thus, iterative compilation is an excellent optimization tool for developing libraries, but unfortunately it can be used only for the simplest of code, given its cost in use.

On the same lines, technology of the automatic tuning linear algebra software type enables some optimization to be performed (selecting good parameters such as block sizes). Unfortunately, that technique is very limited in use, since it depends to a great extent on the type of application under consideration (computation on dense matrices, computation characterized by a very high degree of time locality).

Existing tools for analyzing performance are very varied (in particular as a function of the looked-for objective):

Performance testing ("benchmarks"): these are pieces of code that are more or less representative of a field of application and that enable the performance of various machines to be compared.

Simulators: these enable the behavior of an architecture to be understood at a final level. Unfortunately they are very expensive, difficult to develop, very slow, and not necessarily an accurate representation of the target processor.

Mathematical models: the idea is to put the performance of the machine into equation form. In general their use is extremely limited and they are effective only for studying different simple variants around the same piece of very simple code.

Tools for monitoring and/or managing profiles: these tools serve to recover different kinds of information relating to the execution of a program (by using computers having specialized hardware), where such information relates to number of cycles, number of misses, etc.

The following remarks can be formulated:

Performance tests have progressed little, and above all they have become the subject of commercial stakes that are too great. Very often, suppliers optimize code specifically to perform well in benchmark testing, which leads to the scope and the validity of the results obtained being misleading.

Simulators: it is becoming more and more difficult to make use of the results they give (for optimizing code) insofar as the architecture that is targeted has become very complex.

Mathematical models: these have progressed little, and apart from the above-mentioned local use they are unusable. One of the reasons is that good mathematical modeling tools rely on behavior being "uniformly average", which is far from true in practice.

Tools for monitoring and/or management profiles: these suffer essentially from three defects: they give information that is global and not associated with how activity is distributed over time; they do not enable code and behavior to be correlated at a fine level; and finally making effective use thereof is very difficult (as with a simulator), in particular because of the complexity of the target architecture.

The present invention seeks to remedy the above-described drawbacks and to make it possible for a predefined hardware platform comprising at least one processor, to operate in automatic manner on source code supplied by users to generate optimized code that runs on the platform for a predetermined field of application.

More particularly, the invention seeks to increase the performance of computer systems in a manner that is independent of the selected source language, and to do this for systems that implement processors of architecture that may make use of instructions that are simple or complex and that may include a larger or smaller number of registers, of functional units, and of cache levels.

Another object of the invention is to avoid the limitations of the functional coverage of specialized program libraries and it seeks to create a system for automatically generating code that is optimized for a large number of similar code structures, that may present different levels of complexity.

According to the invention, these objects are achieved by a system for operating automatically on source code submitted by users to generate optimized code suitable for running on a predefined hardware platform comprising at least one processor, and for use in a predetermined field of application, the system being characterized in that it comprises means for receiving symbolic code sequences referred to as benchmark sequences representative of the behavior of said processor in terms of performance, for the predetermined field of application; means for receiving first static parameters defined on the basis of the predefined hardware platform, its processor, and the benchmark sequences; means for receiving dynamic parameters also defined from the predefined hardware platform, its processor, and the benchmark sequences; an analyzer device for establishing optimization rules from tests and measurements of performance carried out using the benchmark sequences, the static parameters, and the dynamic parameters; a device for optimizing and generating code receiving firstly the benchmark sequences and secondly the optimization rules for examining the user source code, detecting optimizable loops, decomposing them into kernels, and assembling and injecting code to deliver the optimized code; and means for reinjecting information coming from the device for generating and optimizing code and relating to the kernels back into the benchmark sequences.

More particularly, the analyzer device comprises a test generator connected firstly to the means for receiving benchmark sequences and secondly to the means for receiving static parameters in order to generate automatically a large number of test variants which are transferred by transfer means to be stored in a variant database; an exerciser connected firstly to transfer means for receiving the test variants stored in the variant database and secondly to the means for receiving dynamic parameters to execute the test variants in a range of variation of the dynamic parameters and produce results which are transferred by transfer means for storage in a results database; and an analyzer connected to the transfer means to receive the results stored in the results database, to analyze them, and to deduce therefrom optimization rules which are transferred by transfer means into an optimization rules database.

Advantageously, the analyzer includes filter means having an arbitrary threshold for optimum performance, so as to consider a variant in the results database as being optimal in the parameter space providing it satisfies the filter criteria.

In a preferred embodiment, the analyzer further comprises means for modifying the static parameters and means for modifying the dynamic parameters.

The device for optimizing and generating code comprises a device for generating optimized code and an optimizer, the optimizer comprising a strategy selection module connected firstly to the means for receiving kernels identified in the original source code, secondly to the means for receiving benchmark sequences, and thirdly to means for receiving optimization rules so as to generate, for each kernel corresponding to a tested benchmark sequence, a plurality of versions, each being optimal under a certain combination of parameters, and a combination and assembly module connected to the means for receiving optimization rules, to means for receiving information coming from the strategy selection module, and to means for receiving the plurality of versions, in order to deliver via transfer means information comprising the corresponding optimized versions, their utilization zone, and where appropriate the test to be executed in order to determine dynamically which version is the most suitable.

In a preferred optional embodiment, the system comprises an optimized kernel database, and the combination and assembly module is connected to the optimized kernel database by transfer means for storing information in said optimized kernel database, said information comprising the optimized versions, their utilization zones, and where appropriate the test to be executed in order to determine dynamically which version is the most suitable.

The device for optimizing and generating code comprises an optimizer and a device for generating optimized code, which device comprises a module for detecting optimizable loops that is connected to means for receiving user source code, a module for decomposing them into kernels, a module for case analysis, assembly, and code injection that is connected via transfer means to the optimizer to transmit the identity of the detected kernel, and transfer means for receiving the information describing the corresponding optimized kernel, with the module for case analysis, assembly, and code injection also being connected to means for supplying optimized code.

The module for case analysis, assembly, and code injection is also connected to the optimized kernel database to receive information describing an optimized kernel without invoking the optimizer if the looked-for kernel has been stored therein.

According to an advantageous characteristic, the module for case analysis, assembly, and code injection further comprises means for adding to the benchmark sequences, kernels that have been discovered in the module for case analysis, assembly, and code injection, without having the corresponding identity in the optimized kernel database nor in the benchmark sequences.

In a particular embodiment, the system includes a compiler and a link editor for receiving reorganized source code from the device for optimizing and generating code, and for producing optimized binary code adapted to the hardware platform.

The system may include means for transferring the source code for the optimized kernels from the optimized kernel database to the compiler.

In another variant embodiment, the system may include a compiler and an installation module for installing a dynamic library on the hardware platform, which library contains all of the capabilities of the optimized kernels.

The invention can be applied to different fields of application, and in particular to scientific computation, to signal processing, and to graphics processing.

According to a particular characteristic, the benchmark sequences comprise a set of simple and generic loop type code fragments specified in a source type language and organized in a hierarchy of levels by order of increasing complexity of the code for the loop body.

Where appropriate, the benchmark sequences comprise benchmark sequences of level 0 in which only one individual operation is tested and corresponding to a loop body constituted by a single arithmetic expression represented by a tree of height 0.

In addition, the benchmark sequences may comprise benchmark sequences of level 1 for which there are considered and tested: combinations of two level 0 operations; and level 1 benchmark sequence operations corresponding to loop bodies constituted either by a single arithmetic expression represented by a tree of height 1, or by two arithmetic expressions, each being represented by a tree of height 0.

In one possible embodiment, the benchmark sequences comprise benchmark sequences of level 2, for which there are considered and tested combinations of two level 1 operations or three level 0 operations.

The static parameters comprise in particular the number of loop iterations for each benchmark sequence, the table access step size and the type of operands, the type of instructions used, the preloading strategies, and the strategies for ordering instructions and iterations.

The dynamic parameters comprise in particular the location of table operands in the various levels of the memory hierarchy, the relative positions of the table starting addresses, and the branching history.

Advantageously, the optimized kernel database includes loop type source code sequences corresponding to code fragments that are real and useful and organized in levels in order of increasing complexity.

The predefined hardware platform may comprise, for example, at least one processor of the so-called Itanium™ type from the supplier Intel, or at least one processor of the Power or Power PC™ type from the supplier IBM.

In one possible embodiment that is more particularly applicable to systems having a processor of the Itanium™ type, the optimization rules comprise at least some of the following rules:

a) minimizing the number of writes, in the event of write performance that is poor compared with read performance;

b) the importance of using loading pairs in floating point;

c) adjusting the degree to which a loop is unrolled as a function of the complexity of the loop body;

d) using operational latencies of arithmetic operations;

e) applying masking techniques for short vectors;

f) using locality suffixes for memory accesses (reading, writing, preloading);

g) defining preloading distances;

h) performing degree 4 vectorization so as to avoid some of the L2 bank conflicts;

i) taking account of multiple variants in order to avoid other L2 bank conflicts and conflicts in the read/write queue;

j) taking account of performance improvements associated with different optimizations;

k) using branching chains that minimize wrong predictions (short vectors);

l) merging memory accesses (grouping pixels together); and m) vectorizing processing on pixels.

In another possible embodiment applicable more particularly to systems including a processor of the Power or Power PC™ type, the optimization rules comprise at least some of the following rules:

a) re-ordering reads in order to group cache defects together;

b) using preloading solely for writes;

c) adjusting the degree to which loops are unrolled as a function of the complexity of the loop body;

d) using operational latencies in arithmetic operations;

e) using locality suffixes for memory accesses (reading, writing, preloading);

f) defining preloading distances;

g) taking account of multiple variants to avoid conflicts in read/write queues; and h) taking account of performance improvements associated with different optimizations.

Other characteristics and advantages of the invention appear from the following description of particular embodiments, made with reference to the accompanying drawings, in which.

Figure 1:
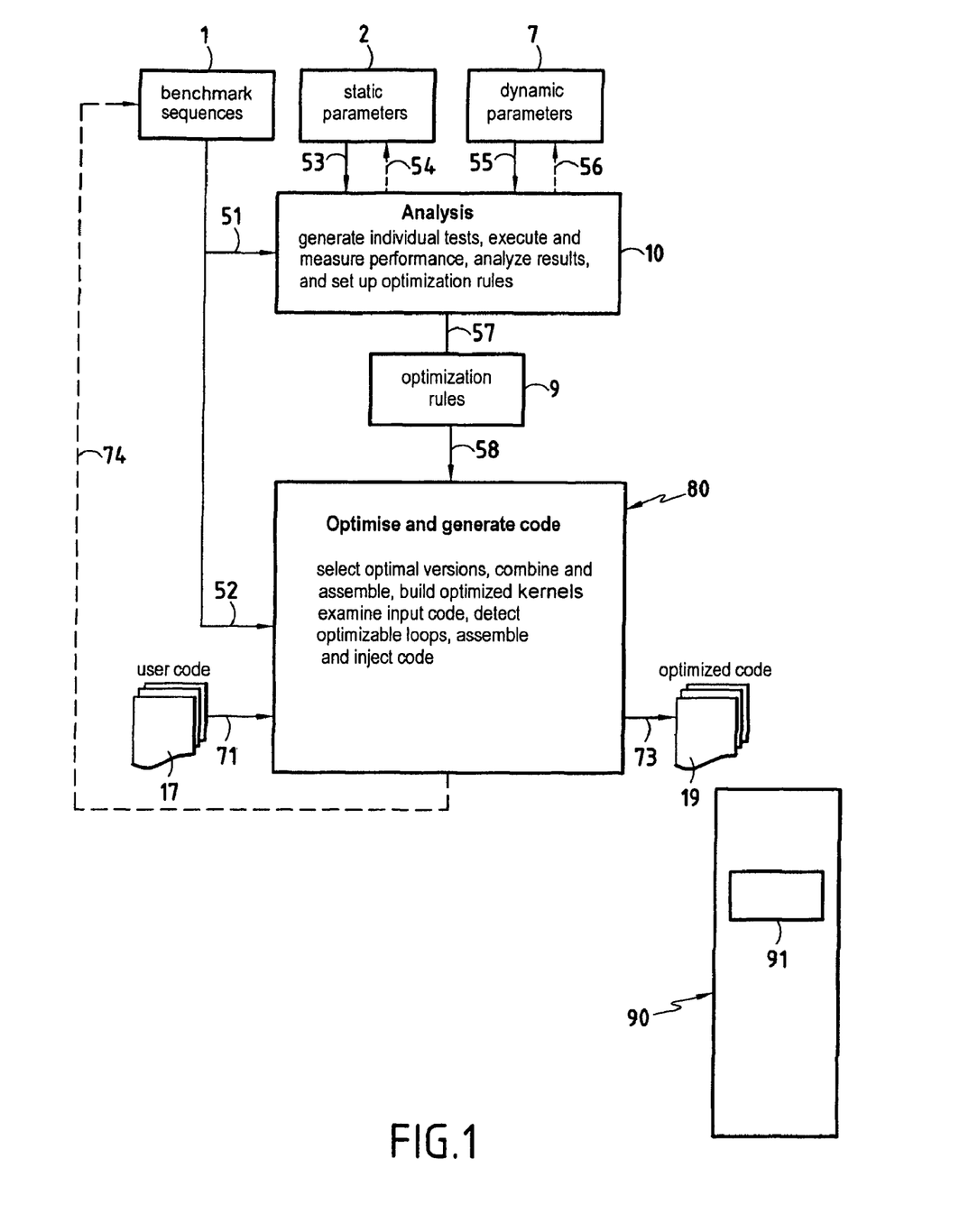
FIG. 1 is a block diagram showing the set of modules making up a system for automatically generating optimized code in accordance with the invention.

Reference is made initially to FIG. 1 which shows the system as a whole for automatically generating optimized code so as to supply, via an output 73 of a module 80 for optimizing and generating code, optimized code that is suitable for running on a predefined hardware platform 90 including at least one processor 91.

The system for generating optimized code is adapted to a determined field of application and it receives, via an input 71 of the module 80, source code 17 submitted by users, where the term "user" should be understood broadly to include not only end users, but also applications programmers and systems programmers.

Symbolic code sequences, referred to as benchmark sequences 1, that are representative of the behavior of the processor 91 in terms of performance for the field of application in question, are applied to an input 52 of the module 80 for optimizing and generating code, and to an input 51 of an analyzer module 10.

By analyzing the effect of various environmental parameters and the interactions between benchmark sequences, it is possible to situate good and poor performance zones and to understand why they are good and poor. The benchmark sequences do not necessarily represent real code sequences generated by conventional programming languages. Only a subset of the tested benchmark sequences corresponds to kernels used for optimizing user code.

An optimizable loop is a program structure encoding the algorithmic representation of a more or less complex operation on variables-vectors.

A kernel or elementary loop constitutes a simple form of optimizable loop. The module 80 of the system of the invention makes it possible to generate automatically optimized kernels in numbers that are significantly greater than the numbers of functions made available in specialized mathematical libraries. In general, several versions of a given kernel can be generated, each version being optimized for some combination of environmental parameters.

The optimization stage in an optimizer 12 (FIG. 3) thus consists in automatically generating a set or library of kernels that are optimized for the target platform 90 representing capabilities that are representative of the field of application.

The optimization stage is associated with a stage of generating code in a code generator 18 (FIG. 3) which examines the source code from the user program in order to detect therein loops that are optimizable so as to force the use of optimized kernels instead of the code that would have been generated by a standard compiler.

Means 74 are provided for reinjecting the information that comes from the module 80 into the benchmark sequences 1.

The stages of optimizing and generating code are preceded by an analysis stage in an analyzer module 10 which, for the target hardware platform 90 and the field of application under consideration, serves to determine the optimization rules to be complied with in order to obtain optimum performance. An output 57 from the analyzer module 10 serves to transfer the optimization rules to an optimization rules database 9, which is itself connected via transfer means 59 to the optimizer 12 of the module 80.

Figure 2:
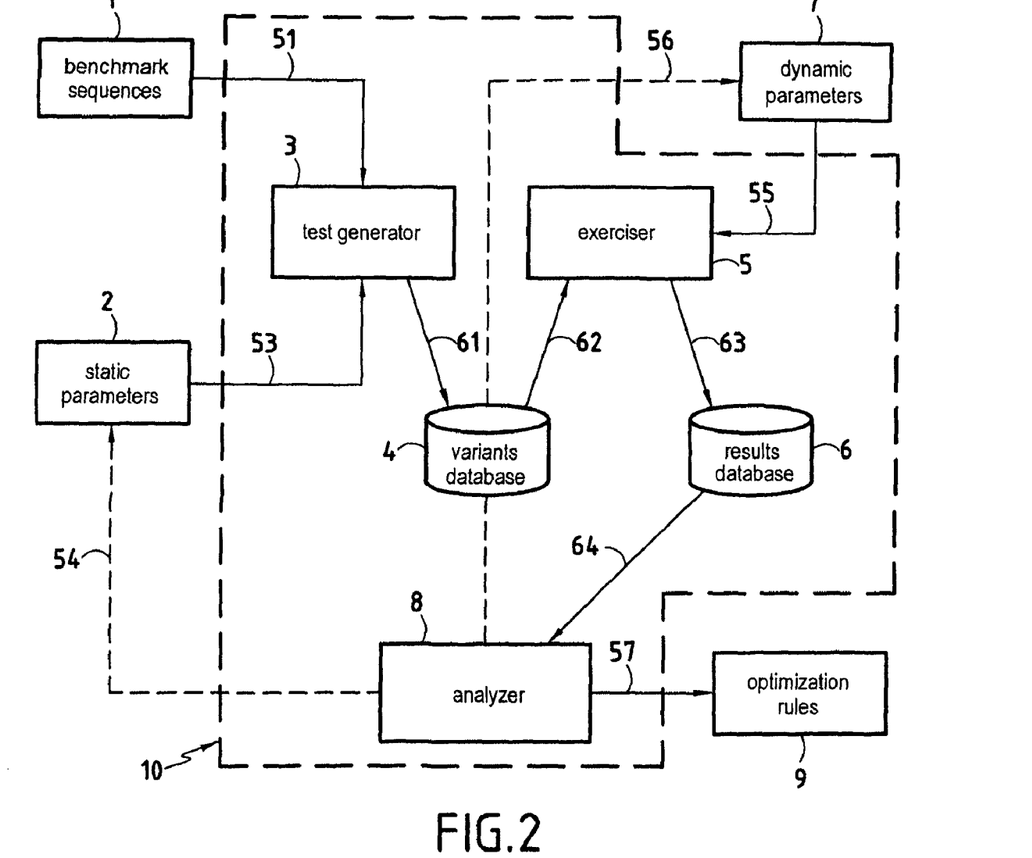
FIG. 2 is a block diagram showing in greater detail the structure of a performance analyzer module that can be implemented in the FIG. 1 system.

The analyzer module 10 is described in greater detail below with reference to FIG. 2.

The analyzer module 10 receives, via means 53 and 54, static parameters 2 and dynamic parameters 7 which are identified as a function of the architecture of the processor 91, and more generally of the system on which the target platform 90 for optimizing is based, and also as a function of the benchmark sequences.

In particular, the static parameters 2 may comprise the number of loop iterations for each benchmark sequence, the table access step size and the type of operand, the type of instructions used, the preloading strategies, and the strategies for ordering instructions and iterations.

In particular, the dynamic parameters 7 may comprise the location of the table operands in the various levels of the memory hierarchy, the relative positions of the table start addresses and the branching history.

In the performance analyzer module 10, a test generator 3 makes use of data relating to the static parameters 2 and the dynamic parameters 7, which parameters are supplied thereto by the inputs 51 and 53, in order to generate a potentially very large number of variants which are transferred by transfer means 61 to a variant database 4.

Another automatic tool 5 referred to as an exerciser receives the variant data and the variant database 4 via transfer means 62 and runs the tests prepared in this way, executing them while varying the dynamic parameters 7 supplied by the transfer means 55 over their range of variation, and transfers pertinent measurements via transfer means 63 to another database 6 referred to as a results database.

The measurements stored in the results database 6 are themselves transferred, by transfer means 64 to an analyzer 8 which, by identifying good and poor zones of performance as a function of the parameters, serves to formulate optimization rules 9 which are transferred by the transfer means 57 to the optimization rules database 9.

The analyzer 8 also has means 54 for modifying the static parameters 2 and means 56 for modifying the dynamic parameters, for example if it finds that sensitivity to variations in a given parameter is small.

The analyzer 8 may include filter means at an arbitrary threshold of optimum performance. Under such circumstances, a variant of the results database which does not correspond to optimum performance can nevertheless be retained as being optimum in the parameter space, providing it satisfies the filter criteria.

The module 80 for optimizing and generating code is described below with reference to FIG. 3.

The optimization device 12 comprises a module 13 for selecting strategy connected to the module 18 for generating code by means 92 for receiving kernels identified in the original source code. The module 13 for selecting strategy is also connected to means 52 for receiving benchmark sequences 1 and to means 58 for receiving optimization rules 9. The module 13 for selecting strategy generates at its output 67, for each kernel corresponding to a tested benchmark sequence, a set 15 of n versions, each of which is optimum for a certain combination of parameters.

A module 14 for combining and assembling versions is connected to the means 59 for receiving optimization rules 9, to means 66 for receiving information coming from the module 13 for selecting strategy, and to means 68 for receiving the plurality 15 of versions 1 to n. The module 14 delivers information via transfer means 93, said information comprising the corresponding optimized versions, their utilization zones, and where appropriate the test that is to be performed in order to determine dynamically which version is the most suitable.

The module 18 for generating optimized code comprises a module 20 for detecting optimizable loops which is connected to means 71 for receiving user source codes 17. The output 75 of the module 20 is connected to a module 22 for decomposing into kernels, having an output 77 itself connected to a module 23 for case analysis, for assembly, and for injecting code, which module is connected via transfer means 92 to the optimizer 12 in order to transmit the identity of the detected kernel. The module 23 also receives, via the transfer means 93, information describing the corresponding optimized kernel. The module 23 is also connected to means 73 for supplying optimized code 19.

In an advantageous embodiment, the module 80 for optimizing and generating code comprises a database 16 of optimized kernels. The combination and assembly module 14 is connected to the optimized kernel database 14 by transfer means 79 for storing in said database: optimized kernels, information comprising the optimized versions, their utilization zones, and where appropriate the tests to be performed for determining dynamically which version is the most suitable. In this variant, the module 23 for case analysis, for assembly, and for injecting code is also connected to the optimized kernel database 16 by the transfer means 72 to receive the information describing an optimized kernel, without invoking the optimizer 12, if the looked-for kernel has already been stored in said database 16.

Figure 3:
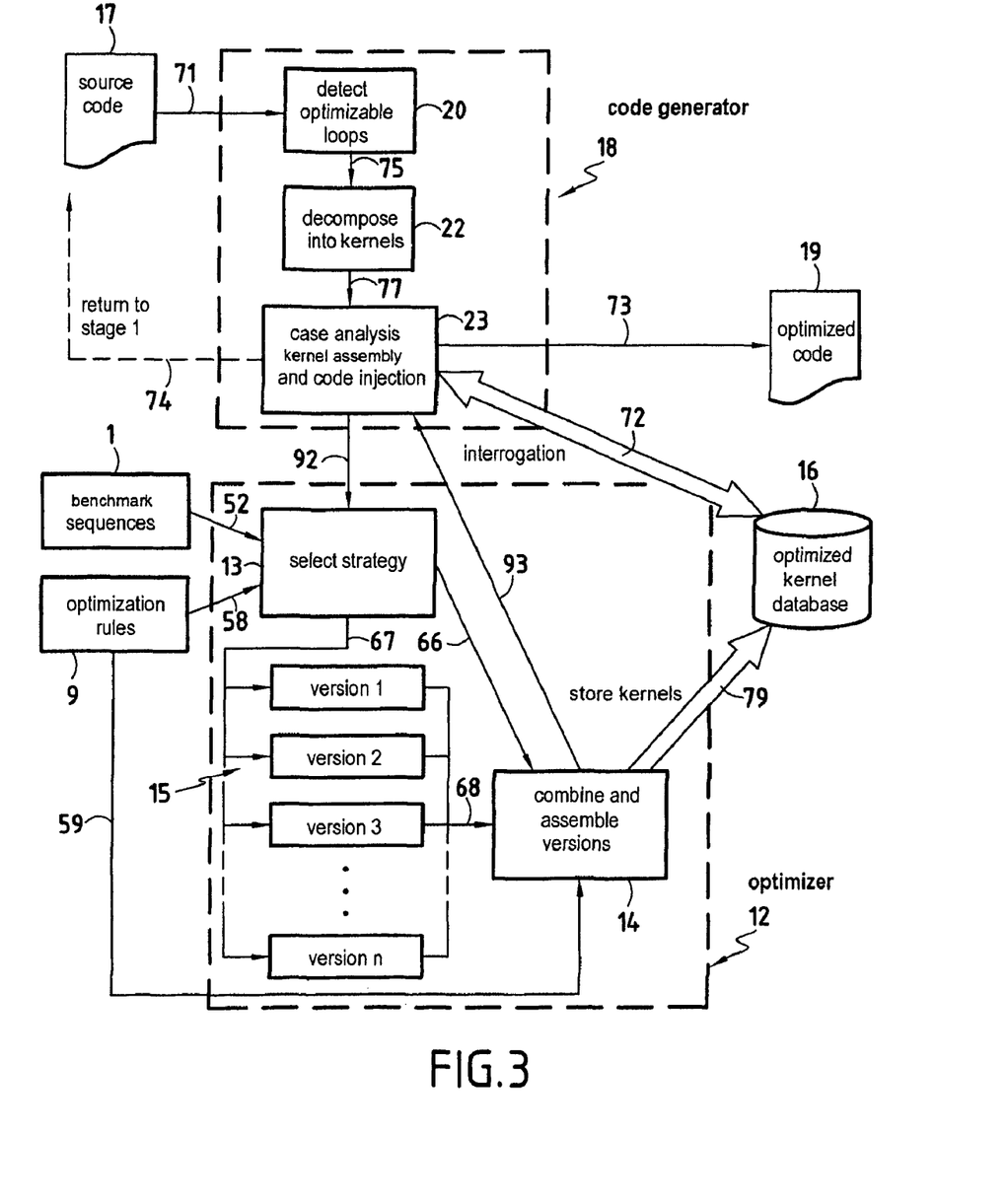
FIG. 3 is a block diagram showing in greater detail the structure of a module for optimizing and generating code that can be implemented in the FIG. 1 system.

As can be seen in FIG. 3, the module 23 for case analysis, for assembly, and for injecting code further comprises means 74 for adding to the benchmark sequences 1 kernels that have been found in said module 23 without having the corresponding identity in the optimized kernel database 16 or in the benchmark sequences.

Figure 4:
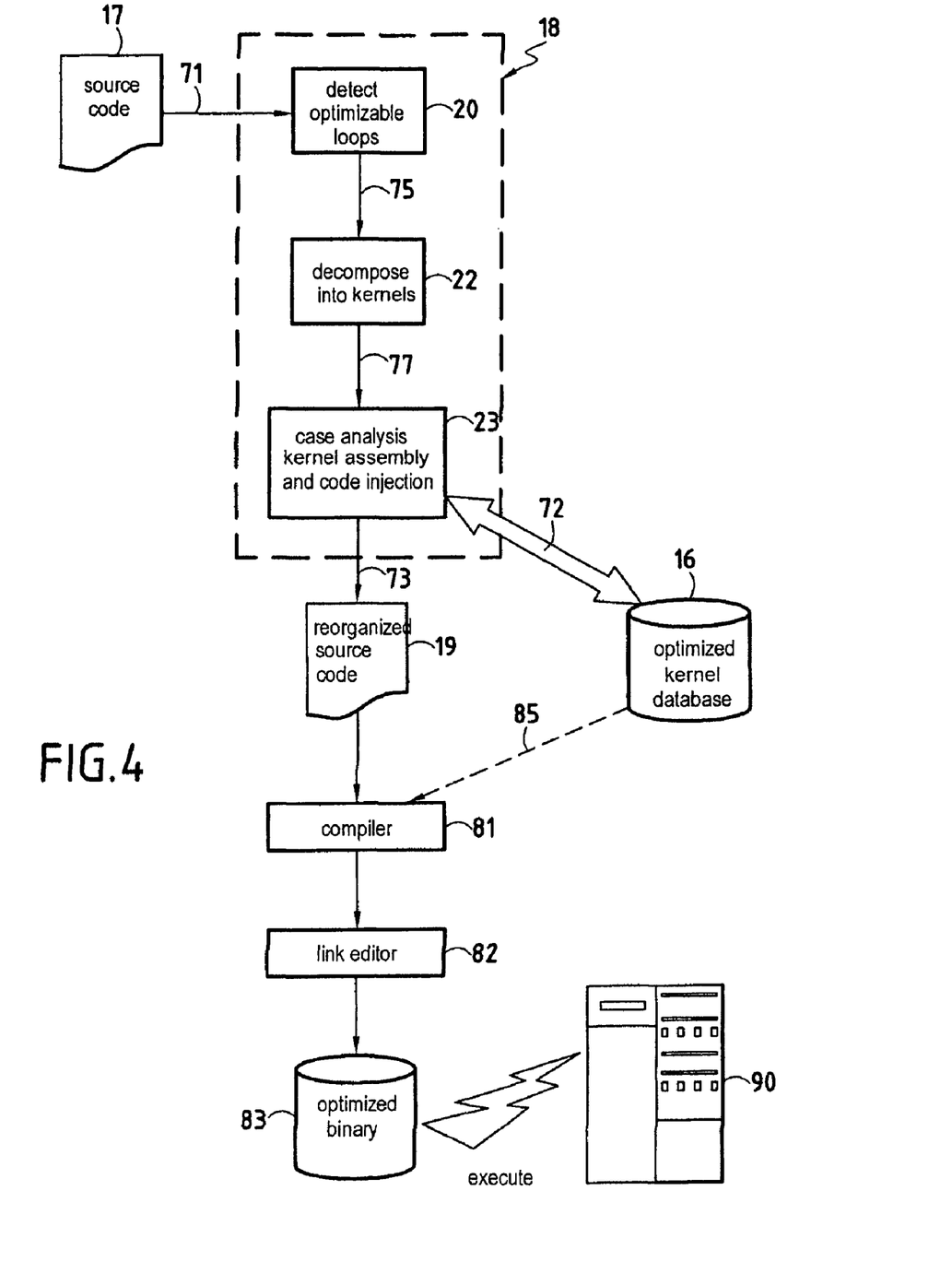
FIG. 4 is a block diagram showing a first embodiment of module for generating reorganized source code, associated with obtaining binary code that is optimized for the corresponding target platform.

FIG. 4 shows a particular embodiment in which the optimizer 12 is not shown since it remains identical to the variant shown in FIG. 3 in which there exists an optimized kernel database 16.

In this embodiment, the module 18 for generating code produces at the output 73 of the module 23 for case analysis, for assembly, and for code injection, a reorganized source code 19 which is subsequently processed by conventional tools 81, 82 for program preparation in order to obtain binary code 83 optimized for the target platform 90.

FIG. 4 shows an embodiment which is very easily implemented. The original user source code 17 is reorganized within the module 80 for optimizing and generating code as described above, in such a manner that its optimizable loops are replaced by calls to subprograms, the code corresponding to the subprograms being injected into the reorganized source code 19 from the optimized kernel database 16. The source code 19 as reorganized in this way then contains everything needed for generating optimized binary code 83 adapted to the hardware platform 90 on passing through a conventional chain comprising a compiler 81 and a link editor 82.

In one possible variant, the source code of the optimized kernels of the optimized kernel database 16 can be used directly in the compilation step as an additional source library. This is represented in FIG. 4 by dashed line arrow 85 connecting the optimized kernel database 16 to the compiler 81. This variant thus serves to avoid directly injecting the source code of the optimized kernels into the reorganized source code, and it makes the generation step within the module 18 easier to perform.

Figure 5:
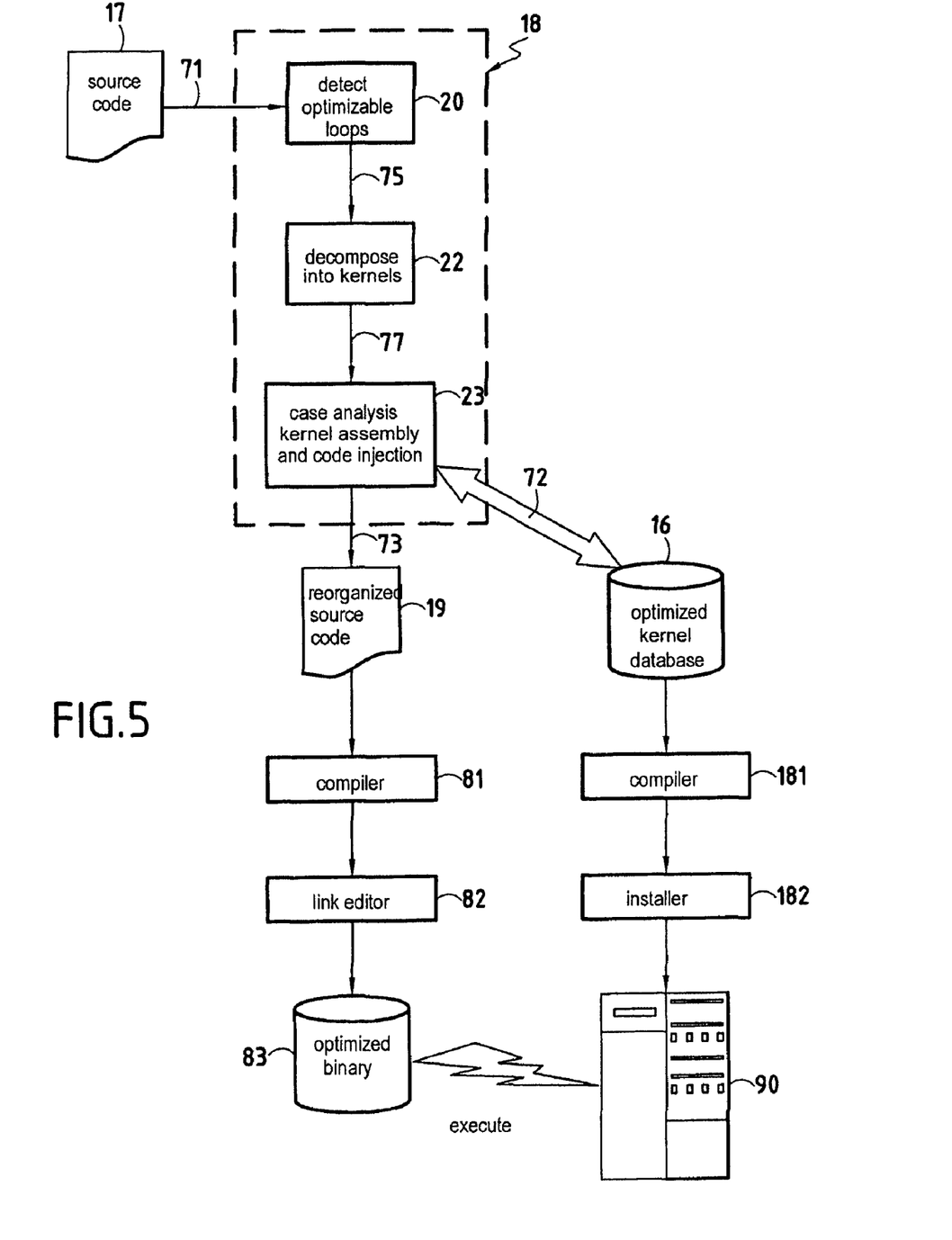
FIG. 5 is a block diagram showing a second embodiment of module for generating reorganized source code, associated with obtaining binary code that is optimized for the corresponding target platform.

FIG. 5 shows an embodiment constituting a variant of the embodiment shown in FIG. 4.

The FIG. 5 variant makes use of the capability provided by certain operating systems whereby libraries can be installed in the form of executable binary code that is accessible to programs by dynamic link editing at the time of execution.

In the variant of FIG. 5, there is no longer any need to inject code from the optimized kernel database 16 into the reorganized source code 19. However, a dynamic library containing all of the capabilities of the optimized kernels must be installed on the target platform 90 via a compiler 181 and an installation module 182. It is possible to use a single compiler in common for the compilers 81 and 181 in FIG. 5. In this variant of FIG. 5, the operation of installation is needed only once for each target platform, such that this variant is more economic in terms of overall treatment of the optimization process.

The system of the invention for generating optimized code is particularly suitable for application to the three fields of: scientific computation; signal processing; and graphics processing.

The code used in these three domains presents various characteristics CHAR1 to CHAR4 which are important for implementation purposes.

CHAR1: loop type structures (or "nested loops") constituting those portions of code that consume the largest amount of execution time.

CHAR2: the data structures used are mostly of the multidimensional table type and are accessed in very regular patterns (rows, columns, blocks, etc.).

CHAR3: the loops (or nested loops) are generally constituted by iterations that are independent and can be run in parallel.

CHAR4: the loop body is generally constituted by a sequence of arithmetic expressions and corresponds to computation that is uniform (or quasi-uniform) over a large volume of data.

Naturally, although these three fields of scientific computation, of signal processing, and of graphics processing possess points in common, they also present certain major differences. Thus, in the field of signal processing, data of the complex number type constitutes a very important type of data which requires specific optimization, whereas the importance of this type of data is marginal in the other two fields. Graphics processing is very marked by the use of one particular type of data, namely pixels, and of special arithmetic. Furthermore, in graphics, data structures and algorithms relating to a two-dimensional stream are of fundamental importance.

The four above characteristics (CHAR1 to CHAR4) have consequences that are very strong for optimizing code and they enable completely specific techniques to be developed:

CHAR1 ⇒optimization concentrates on the loop type structures that present two major advantages: repetitivity (and predictability) and compactness of representation.

CHAR2 ⇒accesses to tables which represent a large fraction of execution time (or indeed a major fraction given the increasing use of cache memory) can easily be analyzed and optimized because of their regularity.

CHAR3 ⇒the independence of iterations within a loop and within nests of loops makes it possible to use (optimize) paths through iteration space as a function of accesses to tables in a manner that depends on the characteristics specific to the target architecture. It may be observed that accessing N given elements of a table can be performed in N! different ways (orders).

CHAR4 ⇒the simple structure of the loop bodies in terms of arithmetic expressions makes it possible to use an approach that is systematic and hierarchical, relying on a tree representation of an arithmetic expression.

The analysis stage remains a stage which is essentially experimental, at the end of which it is necessary:

to have determined the strong points and the weak points of the architecture;

to know how to correlate performance and code structure; and to have identified good optimization strategies, which strategies may be a function of various parameters associated with the code.

As already mentioned, the starting point is a set of "source type" code fragments that are simple but generic and that are referred to as "benchmark sequences". These code fragments are of loop type structure, and the term "source type" is used to mean that the operations are specified at a high level and not at assembler level.

These code fragments are organized in a hierarchy of levels in order of increasing code complexity in the loop body as follows:

LEVEL 0 BENCHMARK SEQUENCE: at this level, a single individual operation is tested, i.e. the loop body comprises a single operation: reading an element from a table, writing an element to a table, floating-point addition, etc. These operations correspond to loop bodies constituted by a single arithmetic expression represented by a tree of height 0.

LEVEL 1 BENCHMARK SEQUENCE: at this level, combinations of two level 0 operations are taken into consideration and tested: reading from and writing to a table, reading from two different tables, reading and adding in a table, etc. These operations correspond to loop bodies constituted either by a single arithmetic expression represented by a tree of height 1, or two arithmetic expressions, each being represented by a respective tree of height 0.

LEVEL 2 BENCHMARK SEQUENCE: at this level, combinations of two level 1 operations or of three level 0 operations are taken into consideration and tested: reading from three different tables, reading and adding in two tables component by component, and writing the result in a third table, etc.

LEVEL K BENCHMARK SEQUENCE: level K can easily be defined by recurrence from the preceding levels.

All of the benchmark sequences of level 0 correspond to code fragments that are "artificial", i.e. they do not represent "real" loops.

This organization in levels of increasing complexity is also used in the optimization stage.

The set of benchmark sequences as defined in this way is infinite.

These benchmark sequences use two different classes of parameters:

Static parameters: these parameters are defined statically (i.e. prior to execution and independently of execution). These static parameters are themselves subdivided into two major subclasses: high level static parameters (number of loop iterations, table access step size, type of operand, . . . ), and low level static parameters (use of specific instructions, instruction ordering, etc.).

Dynamic parameters: these parameters are defined while executing the loop. By way of example, they comprise: location of table operands in the memory hierarchy, relative positions of table start addresses, . . . .

These two classes of parameter are used in very different manners: static parameters are used to generate different test code fragments in combination with the variants and/or optimizations described below, whereas dynamic parameters are used solely during execution on the test bench.

High level static parameters are relatively limited and correspond essentially to the conventional parameters of a loop and of tables as expressed in a high level language (Fortran or C, for example) without any specificities relating to the target processor.

Low level static parameters make it possible to take account of all of the specificities associated with the processor (architecture) and with the ordering of instructions (object code generator). The benchmark sequences are high level abstractions (defined in a source language, and independent of the architecture of the intended processor), and in particular they do not include any optimization. In order to test them on a given processor, the corresponding assembler code fragments must be generated and optimized. During this generation, several variants (assembler instruction sequences) are generated automatically. All of the variants associated with the same benchmark sequence are code fragments that are semantically equivalent to the initial benchmark sequence. It is these variants that are executed and measured. These variants correspond to different code optimization techniques (i.e. to low level static parameters). These optimizations can be defined in abstract manner without reference to the particular structure of a benchmark sequence and they constitute the major portion of the low level static parameters.

The low level static parameters comprise:

using assembler instructions: a single operation at source level can be implemented using different sequences of instructions. In particular, it is necessary at this point to deal with different possible strategies for using preloading of data and instructions;

the structure of the loop body: unrolling (to a varying degree) the body of the loop;

the ordering of the loop body: ordering instructions in the loop body (preloading distances, vectorization, grouping cache misses together, processing conflicts between queues); and the ordering of iterations: software pipeline (of varying depth).

In many compilers, the above-described low level static parameters correspond to compile-time options serving to implement the intended optimization in explicit manner.

The role of the test generator 3 is to generate the different variants described above corresponding firstly to high level static parameters (e.g. table access step size) and also to low level static parameters.

It should be observed that for level 1 benchmark sequences, the total number of variants to be generated and analyzed is extremely high, and can be counted in millions. In spite of that, the generation and analysis process can be automated very simply.

In the exerciser 5 and the analyzer 8, the objective is to test the performance of the different variants and to select the best possible variants and/or optimizations.

This stage implies generating a large number of results that are stored in the results database 6. The experiments are carried out in hierarchical manner interlaced with analysis stages: thus, the initial experiments are performed on the variants of the level 0 benchmark sequences. At the end of this first campaign of experiments, a first sort can be performed on the different variants as a function of the results obtained. Some variants can thus be eliminated immediately and will not be taken into consideration for the following levels. This makes it possible to limit the combinational explosion of the number of experiments that need to be performed.

The stage of analyzing the results is, on first sight, quite simple to perform since only one metric (performance) is used. In fact, a large portion of the complexity of the process comes from the fact that in general selecting the best variants depends very strongly on the parameters.

A first sort can be performed very simply by calculating the optimum performance for each benchmark sequence on the basis of the specifications for the architecture. Unfortunately, difficulties can quickly arise associated with complex interactions between architecture and code (including for code fragments as simple as level 0 and level 1 benchmark sequences): this leads to complicated figures describing the variations in performance as a function of parameters. Such complex behavior can initially be analyzed by using image processing algorithms, and then synthesized by qualifying a given variant for a certain parameter range. Thus, the analysis stage does not merely generate a list giving the best (and sole) variant and optimization technique for each benchmark sequence: a list of parameter ranges is determined for each benchmark sequence, and for each of these ranges, the best variant and optimization technique is specified: it is information of this kind that is referred to as an "optimization rule".

The set of benchmark sequences that are tested is a very small subset of the total number of benchmark sequences. This set which is used subsequently for optimization purposes is referred to as the "set of reference benchmark sequences".

In practice, it is very important to set a "reasonable" optimization target: searching at all costs for the optimum can lead to a very high number of variants, whereas relaxing the optimum constraint and being content with performance that lies within about 5% to 10% of optimum, enables a single variant to be used over a very wide range of parameters. To do this, filtering is implemented, e.g. at a threshold of 90% of optimum performance.

In practice, it suffices to test and analyze the benchmark sequences at levels 0, 1, and 2 only in order to find and validate the main optimization techniques. The set of reference benchmark sequences will generally not contain sequences of level greater than 3.

The volume of experiments to be performed quickly becomes very large, particularly above level 2.

The experiments as a whole lend themselves in ideal manner to parallel operation: the test can be executed in parallel on 100 or 1000 machines. This parallelization property is extremely useful and makes it possible to undertake systematic searches in acceptable lengths of time.

This stage can be fully automated and the procedures for verifying the quality and the consistency of the results can also be automated. Human intervention is required only for identifying the errors and/or anomalies coming from the analysis of the results produced automatically by the procedures for verifying quality and consistency.

At the end of the analysis stage, the objective is to have a very large number of simple code fragments available that are referred to as "kernels" that are specifically optimized for the target architecture, with the optimization process relying essentially on the optimization techniques discovered at the end of the analysis stage.

Strictly speaking, the "kernels" are loop type source code sequences and constitutes a subset of the general case referred to as benchmark sequences. Unlike benchmark sequences, the kernels correspond to code fragments that are real and useful. Like the benchmark sequences, they are organized in levels in order of increasing complexity.

The generation and/or optimization of these kernels takes place in application of the following four stages:

Correlation with one or more reference benchmark sequences: for the simplest kernels, direct correspondence exists between the kernels and benchmark sequences, whereas for more complex kernels, the kernel needs to be decomposed into a plurality of reference benchmark sequences. This correlation and/or decomposition is performed at source level as a function of the characteristics of the kernel loop body: number of tables, table access step size, etc. . . . .

Generating code and/or ordering instructions and/or optimizing instructions: the optimization techniques detected during the analysis stage (as a function of the corresponding benchmark sequences) are now used and are applied directly to generating and/or optimizing code for the kernels. For any given kernel, several possible versions can be generated as a function of the parameters.

Register allocation: many of the optimization techniques used significantly increase pressure on register availability. Under such circumstances, it is appropriate to organize the way in which all available registers are allocated.

Experimentation and/or validation: the kernel as generated and optimized is tested by using the test bench of the analysis stage. At the end of this stage, a simple model of the performance of the kernel is constructed.

Compared with the conventional optimizations used in a compiler, the optimizations used herein are very different: firstly they are derived directly from a detailed process for evaluating performance (performed during the analysis stage), and subsequently they are much more complex and of higher performance (in particular for allocating registers) since they are executed off-line, i.e. without any time "constraint".

The use of reference benchmark sequences and of generation rules makes it possible to take account firstly of all of the fine characteristics of the architecture (operating characteristics as measured rather than theoretical characteristics), and secondly different versions can be selected as a function of the parameters.

At the end of this stage, an optimized kernel database 16 has been constructed that contains not only the kernels as generated, but also information relating to their performance as a function of the various parameters. Each kernel is also tested using the same procedure as is used for the benchmark sequences.

In practice, the optimized kernel database 16 comprises in systematic and exhaustive manner all kernels of levels 1, 2, 3, 4, and 5. The cost in terms of computation volume for constructing this database is large, however like the stage of analyzing performance, it can be performed in parallel very effectively.

User code optimization takes place in three stages:

Detecting optimizable loops (module 20): this consists in recognizing loops in the source code that are capable of being broken down into kernels. This stage makes use of techniques that are very similar to those used for automatic parallelizers and/or vectorizers. Where necessary, the source code is restructured in order to cause the loop to appear in its form that is the most favorable for optimization.

Analysis of the optimizable loop and decomposition into kernels (module 22): this relies on techniques for configuration matching and decomposition that are close to those used for optimizing the kernels, with the loop being decomposed into a sequence of kernels.

Assembling and injecting code (module 23): the various kernels used for decomposition purposes are assembled and reinjected into the source code.

The decomposition procedure is generally parameterized as a function of the characteristics of the original source loop.

The proposed optimizations can be integrated:

either in a preprocessor in an existing compilation chain, with this being done in a manner that is transparent, i.e. without it being necessary to have access to the code of the compiler; or else directly in a compiler, with this naturally requiring modifications to be made in the code of the compiler.

As mentioned above with reference to FIG. 3, at the end of the analysis stage, a certain number of optimization rules become available: these rules are a function of the benchmark sequence and of the parameter range. Instead of passing via the intermediate kernel step, one possible variant is to correlate the optimizable loop directly with the benchmark sequences and to apply the optimization rules directly to the optimizable loop without making use of the kernels stored in the optimized kernel database 16.

This variant is simpler than making use of the kernels and it enables the optimization rules to be used more flexibly. However, because it is undertaken essentially in line, the number of variants explored will necessarily be much smaller, and as a result the performance that is obtained will a priori be less good.

At the end of the optimization stage, the system has generated optimized forms for a certain number of "optimizable" loops, which a priori were not directly available in the kernel database since they have required a decomposition operation. These optimized forms can themselves be stored in the optimized kernel database 16 and reused subsequently. Thus, the kernel database 16 is enriched automatically by this form of training.

The invention claimed is:

1. A system for operating automatically on source code submitted by users to generate optimized code suitable for running on a predefined hardware platform comprising at least one processor, and for use in a predetermined field of application, the system being characterized in that it comprises means for receiving symbolic code sequences referred to as benchmark sequences representative of the behavior of said processor in terms of performance, for the predetermined field of application; means for receiving first static parameters defined on the basis of the predefined hardware platform, its processor, and the benchmark sequences; means for receiving dynamic parameters also defined on the basis of the predefined hardware platform, its processor, and the benchmark sequences; an analyzer device for establishing optimization rules from tests and measurements of performance carried out using the benchmark sequences, the static parameters, and the dynamic parameters; a device for optimizing and generating code receiving firstly the benchmark sequences and secondly the optimization rules for examining the user source code, detecting optimizable loops, decomposing them into kernels, and assembling and injecting code to deliver the optimized code; and means for reinjecting information coming from the device for generating and optimizing code and relating to the kernels back into the benchmark sequences, wherein the benchmark sequences comprise a set of simple and generic loop type code fragments specified in a source type language and organized in a hierarchy of levels by order of increasing complexity of the code for the loop body.

2. A system according to claim 1, characterized in that the analyzer device comprises a test generator connected firstly to the means for receiving benchmark sequences and secondly to the means for receiving static parameters in order to generate automatically a large number of test variants which are transferred by transfer means to be stored in a variant database, an exerciser connected firstly to transfer means for receiving the test variants stored in the variant database and secondly to the means for receiving dynamic parameters to execute the test variants in a range of variation of the dynamic parameters and produce results which are transferred by transfer means for storage in a results database, and an analyzer connected to the transfer means to receive the results stored in the results database, to analyze them, and to deduce therefrom optimization rules which are transferred by transfer means into an optimization rules database.

3. A system according to claim 2, characterized in that the analyzer includes filter means having an arbitrary threshold for optimum performance, so as to consider a variant in the results database as being optimal in the parameter space providing it satisfies the filter criteria.

4. A system according to claim 2, characterized in that the analyzer further comprises means for modifying the static parameters and means for modifying the dynamic parameters.

5. A system according to claim 1, characterized in that the device for optimizing and generating code comprises a device for generating optimized code and an optimizer, the optimizer comprising a strategy selection module connected firstly to the means for receiving kernels identified in the original source code, secondly to the means for receiving benchmark sequences, and thirdly to means for receiving optimization rules so as to generate, for each kernel corresponding to a tested benchmark sequence, a plurality of versions, each being optimal under a certain combination of parameters, and a combination and assembly module connected to the means for receiving optimization rules, to means for receiving information coming from the strategy selection module, and to means for receiving the plurality of versions, in order to deliver via transfer means information comprising the corresponding optimized versions, their utilization zone, and where appropriate the test to be executed in order to determine dynamically which version is the most suitable.

6. A system according to claim 5, characterized in that it comprises an optimized kernel database, and in that the combination and assembly module is connected to the optimized kernel database by transfer means for storing information in said optimized kernel database, said information comprising the optimized versions, their utilization zones, and where appropriate the test to be executed in order to determine dynamically which version is the most suitable.

7. A system according to claim 1, characterized in that the device for optimizing and generating code comprises an optimizer and a device for generating optimized code, which device comprises a module for detecting optimizable loops that is connected to means for receiving user source code, a module for decomposing them into kernels, a module for case analysis, assembly, and code injection that is connected via transfer means to the optimizer to transmit the identity of the detected kernel, and transfer means for receiving the information describing the corresponding optimized kernel, with the module for case analysis, assembly, and code injection also being connected to means for supplying optimized code.

8. A system according to claim 7, characterized in that:
it comprises an optimized kernel database, and in that the combination and assembly module is connected to the optimized kernel database by transfer means for storing information in said optimized kernel database, said information comprising the optimized versions, their utilization zones, and where appropriate the test to be executed in order to determine dynamically which version is the most suitable;
the module for case analysis, assembly, and code injection is also connected to the optimized kernel database to receive information describing an optimized kernel without invoking the optimizer if the looked-for kernel has been stored therein.

9. A system according to claim 8, characterized in that the module for case analysis, assembly, and code injection further comprises means for adding to the benchmark sequences, kernels that have been discovered in the module for case analysis, assembly, and code injection, without having the corresponding identity in the optimized kernel database nor in the benchmark sequences.

10. A system according to claim 6, characterized in that it includes a compiler and a link editor for receiving reorganized source code from the device for optimizing and generating code, and for producing optimized binary code adapted to the hardware platform.

11. A system according to claim 10, characterized in that it includes means for transferring the source code for the optimized kernels from the optimized kernel database to the compiler.

12. A system according to claim 10, characterized in that it includes a compiler and an installation module for installing a dynamic library on the hardware platform, which library contains all of the capabilities of the optimized kernels.

13. A system according to claim 1, characterized in that the predetermined field of application is scientific computation.

14. A system according to claim 1, characterized in that the predetermined field of application is signal processing.

15. A system according to claim 1, characterized in that the predetermined field of application is graphics processing.

16. A system according to claim 1, characterized in that the benchmark sequences comprise benchmark sequences of level 0 in which only one individual operation is tested and corresponding to a loop body constituted by a single arithmetic expression represented by a tree of height 0.

17. A system according to claim 16, characterized in that the benchmark sequences comprise benchmark sequences of level 1 for which there are considered and tested: combinations of two level 0 operations; and level 1 benchmark sequence operations corresponding to loop bodies constituted either by a single arithmetic expression represented by a tree of height 1, or by two arithmetic expressions, each being represented by a tree of height 0.

18. A system according to claim 17, characterized in that the benchmark sequences comprise benchmark sequences of level 2, for which there are considered and tested combinations of two level 1 operations or three level 0 operations.

19. A system according to claim 1, characterized in that the static parameters comprise in particular the number of loop iterations for each benchmark sequence, the table access step size and the type of operands, the type of instructions used, the preloading strategies, and the strategies for ordering instructions and iterations.

20. A system according to claim 1, characterized in that the dynamic parameters comprise in particular the location of table operands in the various levels of the memory hierarchy, the relative positions of the table starting addresses, and the branching history.

21. A system according to claim 6, characterized in that the optimized kernel database includes loop type source code sequences corresponding to code fragments that are real and useful and organized in levels in order of increasing complexity.

22. A system according to claim 1, characterized in that the predefined hardware platform comprises at least one Itanium type processor.

23. A system according to claim 1, characterized in that the predefined hardware platform comprises at least one Power or Power PC type processor.

24. A system according to claim 13, and characterized in that the predefined hardware platform comprises at least one processor from the group consisting of Itanium type processor and Power or Power PC type processor, and the optimization rules comprise at least some of the following rules:
   a) minimizing the number of writes, in the event of write performance that is poor compared with read performance;
   b) the importance of using loading pairs in floating point;
   c) adjusting the degree to which a loop is unrolled as a function of the complexity of the loop body;
   d) using operational latencies of arithmetic operations;
   e) applying masking techniques for short vectors;
   f) using locality suffixes for memory accesses (reading, writing, preloading);
   g) defining preloading distances;
   h) performing degree 4 vectorization so as to avoid some of the L2 bank conflicts;
   i) taking account of multiple variants in order to avoid other L2 bank conflicts and conflicts in the read/write queue;
   j) taking account of performance improvements associated with different optimizations;
   k) using branching chains that minimize wrong predictions (short vectors);
   l) merging memory accesses (grouping pixels together); and
   m) vectorizing processing on pixels.

25. A system according to any one of claim 13, and characterized in that the predefined hardware platform comprises at least one Power or Power PC type processor, and the optimization rules comprise at least some of the following rules:
   a) re-ordering reads in order to group cache defects together;
   b) using preloading solely for writes;
   c) adjusting the degree to which loops are unrolled as a function of the complexity of the loop body;
   d) using operational latencies in arithmetic operations;
   e) using locality suffixes for memory accesses (reading, writing, preloading);
   f) defining preloading distances;
   g) taking account of multiple variants to avoid conflicts in read/write queues; and
   h) taking account of performance improvements associated with different optimizations.

26. A system according to claim 3, characterized in that:
   the analyzer further comprises means for modifying the static parameters and means for modifying the dynamic parameters;
   the device for optimizing and generating code comprises a device for generating optimized code and an optimizer, the optimizer comprising a strategy selection module connected firstly to the means for receiving kernels identified in the original source code, secondly to the means for receiving benchmark sequences, and thirdly to means for receiving optimization rules so as to generate, for each kernel corresponding to a tested benchmark sequence, a plurality of versions, each being optimal under a certain combination of parameters, and a combination and assembly module connected to the means for receiving optimization rules, to means for receiving information coming from the strategy selection module, and to means for receiving the plurality of versions, in order to deliver via transfer means information comprising the corresponding optimized versions, their utilization zone, and where appropriate the test to be executed in order to determine dynamically which version is the most suitable;
   it comprises an optimized kernel database, and in that the combination and assembly module is connected to the optimized kernel database by transfer means for storing information in said optimized kernel database, said information comprising the optimized versions, their utilization zones, and where appropriate the test to be executed in order to determine dynamically which version is the most suitable;
   the device for optimizing and generating code comprises an optimizer and a device for generating optimized code, which device comprises a module for detecting optimizable loops that is connected to means for receiving user source code, a module for decomposing them into kernels, a module for case analysis, assembly, and code injection that is connected via transfer means to the optimizer to transmit the identity of the detected kernel, and transfer means for receiving the information describing the corresponding optimized kernel, with the module for case analysis, assembly, and code injection also being connected to means for supplying optimized code;
   the module for case analysis, assembly, and code injection is also connected to the optimized kernel database to receive information describing an optimized kernel without invoking the optimizer if the looked-for kernel has been stored therein;

the module for case analysis, assembly, and code injection further comprises means for adding to the benchmark sequences, kernels that have been discovered in the module for case analysis, assembly, and code injection, without having the corresponding identity in the optimized kernel database nor in the benchmark sequences;

it includes a compiler and a link editor for receiving reorganized source code from the device for optimizing and generating code, and for producing optimized binary code adapted to the hardware platform;

it includes means for transferring the source code for the optimized kernels from the optimized kernel database to the compiler;

it includes a compiler and an installation module for installing a dynamic library on the hardware platform, which library contains all of the capabilities of the optimized kernels.

27. A system according to claim 26, characterized in that:

the predetermined field of application is selected from the group consisting of scientific computation, signal processing and graphics processing.

28. A system according to claim 27, characterized in that:

the benchmark sequences comprise benchmark sequences of level 0 in which only one individual operation is tested and corresponding to a loop body constituted by a single arithmetic expression represented by a tree of height 0;

the benchmark sequences comprise benchmark sequences of level 1 for which there are considered and tested: combinations of two level 0 operations; and level 1 benchmark sequence operations corresponding to loop bodies constituted either by a single arithmetic expression represented by a tree of height 1, or by two arithmetic expressions, each being represented by a tree of height 0;

the benchmark sequences comprise benchmark sequences of level 2, for which there are considered and tested combinations of two level 1 operations or three level 0 operations;

the static parameters comprise in particular the number of loop iterations for each benchmark sequence, the table access step size and the type of operands, the type of instructions used, the preloading strategies, and the strategies for ordering instructions and iterations;

the dynamic parameters comprise in particular the location of table operands in the various levels of the memory hierarchy, the relative positions of the table starting addresses, and the branching history.

29. A system according to claim 9, characterized in that the optimized kernel database includes loop type source code sequences corresponding to code fragments that are real and useful and organized in levels in order of increasing complexity.

30. A system according to claim 27, and characterized in that the predefined hardware platform comprises at least one processor from the group consisting of Itanium type processor and Power or Power PC type processor, and the optimization rules comprise at least some of the following rules:
 a) minimizing the number of writes, in the event of write performance that is poor compared with read performance;
 b) the importance of using loading pairs in floating point;
 c) adjusting the degree to which a loop is unrolled as a function of the complexity of the loop body;
 d) using operational latencies of arithmetic operations;
 e) applying masking techniques for short vectors;
 f) using locality suffixes for memory accesses (reading, writing, preloading);
 g) defining preloading distances;
 h) performing degree 4 vectorization so as to avoid some of the L2 bank conflicts;
 i) taking account of multiple variants in order to avoid other L2 bank conflicts and conflicts in the read/write queue;
 j) taking account of performance improvements associated with different optimizations;
 k) using branching chains that minimize wrong predictions (short vectors);
 l) merging memory accesses (grouping pixels together); and
 m) vectorizing processing on pixels.

31. A system according to claim 27, and characterized in that the predefined hardware platform comprises at least one Power or Power PC type processor, and the optimization rules comprise at least some of the following rules:
 a) re-ordering reads in order to group cache defects together;
 b) using preloading solely for writes;
 c) adjusting the degree to which loops are unrolled as a function of the complexity of the loop body;
 d) using operational latencies in arithmetic operations;
 e) using locality suffixes for memory accesses (reading, writing, preloading);
 f) defining preloading distances;
 g) taking account of multiple variants to avoid conflicts in read/write queues; and
 h) taking account of performance improvements associated with different optimizations.

\* \* \* \* \*

UNITED STATES PATENT AND TRADEMARK OFFICE
CERTIFICATE OF CORRECTION

| | | |
|---|---|---|
| PATENT NO. | : 7,979,852 B2 | Page 1 of 1 |
| APPLICATION NO. | : 10/585797 | |
| DATED | : July 12, 2011 | |
| INVENTOR(S) | : Francois Bodin et al. | |

It is certified that error appears in the above-identified patent and that said Letters Patent is hereby corrected as shown below:

Column 10, line 29, "n" should read --$\underline{n}$--;

Column 10, line 35, "n" should read --$\underline{n}$--;

Column 16, line 62, "a priori" should read --$\underline{\textit{a priori}}$--;

Column 16, line 65, "a priori" should read --$\underline{\textit{a priori}}$--; and Column 20, claim 25, line 4, delete "anyone of".

Signed and Sealed this
Twelfth Day of February, 2013

Teresa Stanek Rea
*Acting Director of the United States Patent and Trademark Office*